(12) United States Patent
Boles

(10) Patent No.: US 7,205,264 B2
(45) Date of Patent: Apr. 17, 2007

(54) WELL TREATMENT METHOD USING FLUID CONTAINING LACTIC ACID OR SALT THEREOF

(75) Inventor: Joel Lynn Boles, Spring, TX (US)

(73) Assignee: BJ Services Company, Houston, TX (US)

( * ) Notice: Subject to any disclaimer, the term of this patent is extended or adjusted under 35 U.S.C. 154(b) by 319 days.

(21) Appl. No.: 10/758,410

(22) Filed: Jan. 15, 2004

(65) Prior Publication Data

US 2004/0152602 A1    Aug. 5, 2004

Related U.S. Application Data

(60) Provisional application No. 60/440,818, filed on Jan. 17, 2003.

(51) Int. Cl.
*E21B 43/27* (2006.01)
*E21B 43/22* (2006.01)
*C09K 8/588* (2006.01)
*C09K 8/60* (2006.01)

(52) U.S. Cl. .................. 507/225; 507/260; 507/120; 166/270; 166/271; 166/307

(58) Field of Classification Search ............... 507/225; 166/271
See application file for complete search history.

(56) References Cited

U.S. PATENT DOCUMENTS 3,481,400 A * 12/1969 Kerver et al. ............... 166/279

| 4,460,751 | A | | 7/1984 | Hanlon et al. |
| 4,488,975 | A | | 12/1984 | Almond |
| 4,624,795 | A | * | 11/1986 | Dawson et al. ............. 507/205 |
| 4,649,999 | A | | 3/1987 | Sandy et al. |
| 4,657,080 | A | | 4/1987 | Hodge |
| 4,657,081 | A | | 4/1987 | Hodge |
| 4,752,404 | A | * | 6/1988 | Burns et al. ................ 507/226 |
| 4,797,216 | A | | 1/1989 | Hodge |
| 4,799,550 | A | | 1/1989 | Harris et al. |
| 4,917,186 | A | * | 4/1990 | Mumallah .................... 166/295 |
| 5,478,802 | A | | 12/1995 | Moradi-Araghi |
| 5,497,830 | A | | 3/1996 | Boles et al. |
| 6,046,140 | A | | 4/2000 | Woo et al. |
| 6,849,581 | B1 | | 2/2005 | Thompson et al. |

FOREIGN PATENT DOCUMENTS

EP    0275624 A1    7/1988

OTHER PUBLICATIONS

Lactic Acid Relative Density, 2001, www/inchem.org/documents/icsc/eics0501.htm.*

* cited by examiner

*Primary Examiner*—Randy Gulakowski
*Assistant Examiner*—Timothy J. Kugel
(74) *Attorney, Agent, or Firm*—Jones & Smith, LLP; John Wilson Jones

(57) ABSTRACT

Fluids comprising an aqueous acid, synthetic polymer, metal crosslinking agent and lactic acid or a salt thereof have particular applicability in fracturing subterranean formations of an oil or gas well. The lactic acid acts as a delaying agent. As a result, crosslinking of the synthetic polymer and metal crosslinking agent typically occurs at a temperature of 100° F. or higher.

43 Claims, 2 Drawing Sheets

WELL TREATMENT METHOD USING FLUID CONTAINING LACTIC ACID OR SALT THEREOF

This application claims the benefit of U.S. patent application Ser. No. 60/440,818, filed on Jan. 17, 2003.

FIELD OF THE INVENTION

The present invention relates generally to a composition for use in the enhancement of productivity of a hydrocarbon-bearing formation and a method of using such compositions.

BACKGROUND OF THE INVENTION

Subterranean formations of oil and gas wells are often treated by hydraulically fracturing the formations to increase the production of oil or gas. Fracturing of the formations is accomplished by pumping fluids into the bore holes of the oil or gas wells under high pressure so that cracks or fissures are opened into the surrounding formation. Typically, the fracturing fluid contains a polymer which will gel the fluid to increase its viscosity. The fluid's viscosity is proportionally related to the created fracture geometry and fracture width so that the more viscous fluids will produce longer and wider fractures. After the fracturing fluid is injected into the formation to produce the fracture, the viscosity of the fluid is reduced by means of "gel breakers" which break down the gelled fluid so that it can be easily pumped and removed from the well.

In certain formations, aqueous acid solutions are used to improve the permeability of the formation, thereby increasing production. These acids are often combined with the polymer gels used in fracturing to provide an acid fracturing fluid. Besides the normal benefits of increasing the efficiency of the fluid's fracturing capabilities (leak-off control, etc.), the polymer gelling agent also provides a barrier to slow down the acid reaction. This is beneficial in that the acid would otherwise react too quickly, depleting the acid with very little penetration of the formation. Once in place, the viscosity of the fluid is reduced so that the acid is released to react with formation damage or other skin present at the face of the newly formed fractures and improving the permeability of the producing strata.

Crosslinked polymer gels have been found to be useful with these aqueous acid solutions. Crosslinked gels are able to withstand the high temperature conditions commonly found in deeper oil and gas wells with little reduction in viscosity, and they exhibit an improved ability in reducing the reaction rate of the acid solution. Organometallic compounds are often used as a crosslinking agent in these polymer gels. Unfortunately, crosslinked acid systems using synthetic polymers and metal crosslinking agents have little to no delay due to the reactiveness of the polymer and metal in acid systems. Typical chelating agents have had little effect on delaying these systems especially where the systems are premixed for 12 or more hours, which often are the case during acid treatments.

A small amount of lactic acid or salts thereof have previously been used in water based fracturing fluids containing sand and a non-synthetic polymer, such as guar or cellulose or cellulosic derivatives, to delay crosslinking. However, such systems exhibit poor stability in aqueous acid solutions.

SUMMARY OF THE INVENTION

Subterranean formations can be successfully fractured by the use of a fluid containing an aqueous acid, synthetic polymer, metal crosslinking agent and lactic acid or a lactic acid salt. Use of such fluids, wherein the concentration of lactic acid or lactic acid salt ranges from about 10 to about 1,000 pounds of lactic acid or salt per 1,000 gallons of the fracturing fluid, delays or impedes the crosslinking reaction of polymer and metal crosslinking agent until a temperature of at least 100° F. is reached in the subterranean formation. The delay in crosslinking does not damage the fluid properties of the crosslinked synthetic polymer containing fluid.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
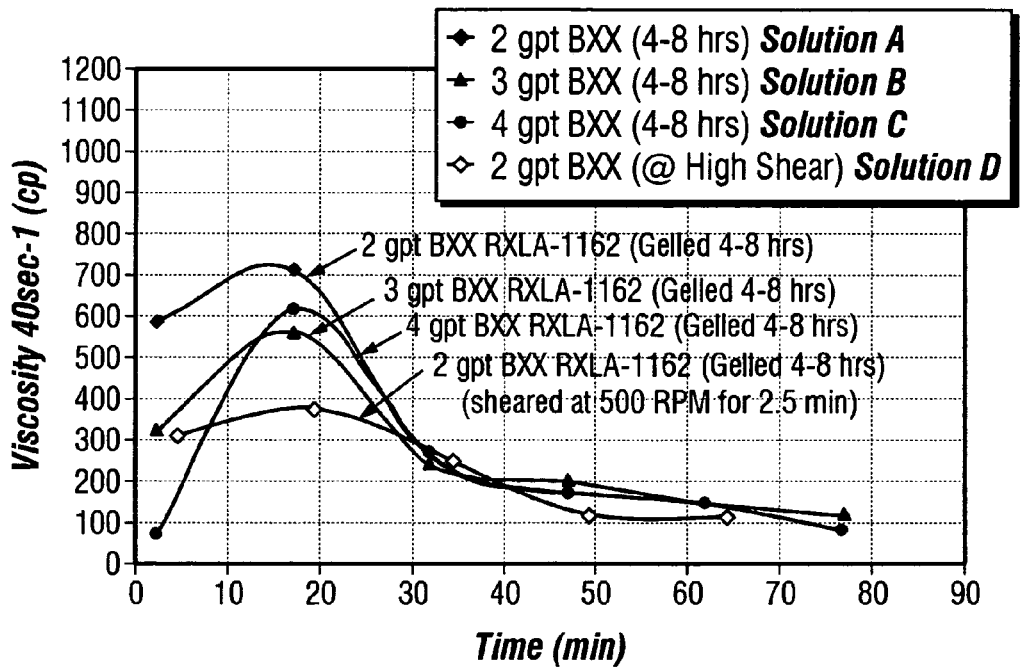
FIG. 1 is a graph of viscosity versus time (in ten minute intervals) from introduction of a fluid of the invention into the subterranean formation, wherein the fluid has been gelled for between 4 to 8 hours prior to introduction into the subterranean formation.

A subterranean formation of an oil or gas well may be stimulated to produce hydrocarbons by injecting at high pressure into the formation a novel fluid. The fluid of the invention has particular applicability in carbonate reservoirs such as limestone or dolomite. The reactive fracturing fluid of the invention comprises an aqueous acid, having a pH of about 0.0, a synthetic polymer, a metal crosslinking agent and lactic acid or a salt thereof. The resulting crosslinked acid gel has particular application in acid fracturing.

The lactic acid component may be pure lactic acid as well as lactic acid diluted with water. When used, the amount of water in the lactic acid component should be no greater than 95 percent by weight. Preferably, the amount of water in the lactic acid components is from about 50 to about 95 weight percent. Suitable salts of lactic acid include the sodium, potassium, calcium, zinc and ammonium salts. Once introduced into the acid system, the lactic acid salt breaks down to lactic acid. The lactic acid component is present at a concentration of from about 10 to about 1,000, more preferably less than about 80, most preferably less than about 25, pounds per 1,000 gallons of fracturing fluid. It is the presence of the lactic acid or lactic acid salt which retards or prevents the crosslinking between the synthetic polymer and the metallic crosslinking agent. Without the presence of lactic acid or lactic acid salt, the crosslinking between synthetic polymer and metal crosslinking agent occurs at approximately 70° F. With the presence of the lactic acid or lactic salt, the crosslinking reaction occurs at elevated temperatures above 70° F., typically above 100° F., more preferably 120° F., most preferably 140° F., generally between from about 120 to about 180° F.

The fracturing acid utilized may be any of the aqueous solutions of acid commonly employed for acidizing formations. The inorganic acid is most preferably hydrochloric acid. Formic acid, acetic acid or other weak acids may be admixed with the hydrochloric acid. The fracturing fluid should preferably have a concentration of about 3 to 28%, and more preferable about 15 to 20%, of the total weight percent of the fluid. Table I represents the amount of HCl and weak acid that may be used in the fracturing fluid of this invention.

TABLE I

Materials Required to Make 1000 Gallons
Range of Acid Composition of Treating Fluids

| Amount of 35.2% concentrated HCl, gallons | Weak Acid, gallons | | Water, gallons |
|---|---|---|---|
| | Acetic 99% | Formic 90% | |
| (3%, no weak acid) 73 | 0 | 0 | 927 |
| (28%, no weak acid) 908 | 0 | 0 | 92 |
| (3%, w/1% Acetic) 73 | 10 | 0 | 917 |
| (28%, w/1% Acetic) 908 | 10 | 0 | 82 |
| (3%, w/10% Acetic) 73 | 92 | 0 | 835 |
| (28%, w/10% Acetic) 908 | 92 | 0 | 0 |
| (3%, w/1% Formic) 73 | 0 | 9 | 918 |
| (28%, w/1% Formic) 908 | 0 | 9 | 83 |
| (3%, w/10% Formic) 73 | 0 | 92 | 835 |
| (28%, w/10% Formic) 908 | 0 | 92 | 0 |

The crosslinking agent may comprise any suitable metallic crosslinker known in the art. In a preferred embodiment, the metal crosslinking agent contains either titanium, zirconium, aluminum, iron or antimony or a mixture thereof. In a preferred embodiment, the crosslinker contains both zirconium and aluminum. The metal may form a complex with a polyfunctional organic acid. Alternatively, an inorganic crosslinking agent may be used. Examples of suitable crosslinkers include zirconium oxychloride, zirconium acetate, zirconium lactate, zirconium malate, zirconium citrate, titanium lactate, titanium malate, titanium citrate and the like.

Any synthetic polymer which is crosslinkable with a metallic crosslinking agent is suitable for use in the invention. Non-limiting examples of useful synthetic polymers include polyvinyl alcohol, poly 2-amino-2-methyl propane sulfonic acid, polyacrylamide, partially hydrolyzed polyacrylamide and copolymers containing acrylamide, terpolymers containing acrylamide, an acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups.

In a preferred mode, the synthetic polymer is an emulsion polymer, such as a copolymer of acrylamidomethylpropane sulfonic acid (AMPS) and acrylamide. Especially preferred copolymers are of the formula:

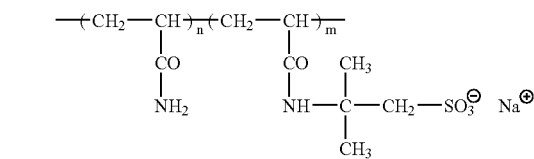

wherein m is 2 to 5 and n is 4 to 8. In one embodiment, such emulsion copolymers comprise a polymer dispersion in a hydrocarbon phase. In another embodiment, the emulsion polymer comprises microemulsion particles. In still another embodiment, the emulsion polymer comprises a liquid polymer dispersion. In a preferred embodiment, the emulsion polymer comprises "BXX-AGA-818" available from BJ Services Co.

In a preferred embodiment, the emulsion polymer has a general composition of about 20 to 50% acrylamidomethylpropane sulfonic acid (AMPS), about 2 to 5% acrylic acid, and about 45 to 78% acrylamide. More preferably, the polymer comprises about 35 to 50% AMPS.

The use of lactic acid delays the time for formation of the gel which is the resultant product from the crosslinking of the synthetic polymer and metal crosslinking agent. The fluid of the invention is injected into the well bore or at least a portion of a subterranean formation at high enough pressures to form fractures within the formation. FIGS. 1, 2, 3 and 4 demonstrate the viscosity of the crosslinked product once it is injected into the well bore.

The fluid of the invention may be prepared by batch mixing, continuous mixing, or other suitable methods known to those of skill in the art. In the continuous mix process, all the additives are added to the acid gel during injection of the fracturing fluid into the well bore. This process negates the need for a storage vessel to hydrate the polymer such as is used in the batch mix process. Problems associated with batch mixing, such as the delay in re-circulating the acid/polymer mixture and the loss of unused product due to an early shut-down, are eliminated, making the continuous mix process more efficient and cost-effective.

Typically, about 5 to 50 gallons of synthetic polymer are added per one thousand gallons of acid (gpt). This is equivalent to a fracturing fluid containing from about 0.33 to about 1.12 percent by weight of synthetic polymer. Preferably, 10 to 30 gpt of synthetic polymer are used, and more preferably, 15 to 20 gallons of synthetic polymer are used. The metallic crosslinking agent comprises about 4 to 20 gpt and more preferably about 8 to 15 gpt.

Gel breakers may further be used in the process of the invention. Materials which complex with the titanium and zirconium crosslinkers include fluoride, phosphate, sulfate anions and multi-carboxylated compounds. Suitable materials containing fluoride which can be used as a gel breaker material include fluorspar, cryolite, fluorosilicates, fluoroborates and fluorophosphates. Because it is readily available, fluorspar, which is a naturally occurring source of calcium fluoride ($CaF_2$), is preferred. Phosphates include the alkali or alkaline earth phosphates. Suitable sulfate anions sources include the alkali or alkaline earth sulfates. The multi-carboxylated compounds include ethylene-diamine tetraacetic acid (EDTA) or its ammonium alkali or alkaline earth metal salt. Phosphonic acid and its salts can also complex with the crosslinkers. A suitable phosphonic acid is provided by diethylenetriamine pente (methylene phosphonic acid). These compounds are capable of complexing with the crosslinked polymer gel linkages so that the linkages are broken to thereby reduce the viscosity of the gel. Due to the desirability of delaying the breaking or reduction of viscosity of the crosslinked polymer acid gels, these complexing materials may be altered so that they are made less reactive when introduced into the gel. Fluorspar, for example, is usually available as very small fines which react readily when introduced into the crosslinked polymer gel. By coating the fluorspar with a water insoluble wood resin material, the fines are agglomerated to form a much larger particle size. The coating also controls the release of the fluoride from the fluorspar. The amount of gel breaker typically used is between 0 to about 30 pounds per 1,000 gallons of fracturing fluid.

Additives used in the oil and gas industry and known in the art, including but not limited to, corrosion inhibitors, non-emulsifiers, reducing agents (such as stannous chloride), iron control agents, silt suspenders, and flowback additives may further be used. (Proppants could be used, such as 100 mesh sand, 20/40 mesh sand, and resin coated sand, but preferably are not in light of the reactivity of the fracturing fluid.) Such additives, when employed, are at low concentrations conventionally used in the art. When present, the amount of such additives in the fracturing fluid of the invention, is dependent on the specification of the customer as well as the parameters of the well. For instance, such additives may be present from 0 to about 50 gallons per 1,000 gallons of fracturing fluid. They are typically added, with the acid, copolymer and lactic acid, to form a base gel, to which is added the crosslinking agent.

The following non-limiting examples, and comparative demonstrations, bring out the more salient features of the invention. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow. All parts are given in terms of weight units except as may otherwise be indicated.

EXAMPLES

The following components were used in Examples 1 and 2 below:
Lactic acid (85% lactic acid and 15% water, "BXX-RXLA-1162");
15% HCl;
1 gpt "CI-25" corrosion inhibitor (a blend of quaternary salts, alcohols, formamide and ethoxylated nonylphenol);
15 gpt "AG57L" acrylamidomethylpropane sulfonic and acrylamide copolymer;
1 gpt "PSA-2L" external activator (hydrate enhancer) composed of alkoxylated alcohols;
3 gpt "Ferrotrol-270" thioglycol solution iron control agent, "Fe-270";
1 gpt "Ferrotrol 271" cupric chloride and sodium chloride in water iron control agent, "Fe-271";
1 gpt "NE940" surfactant composed of a blend of polyglycols in alcohol; and
8 gpt "XLA2" crosslinker composed of aluminum and zirconium salts in water.

Corrosion inhibitor "CI-25" and iron control agents "Ferrotrol-270", "Ferrotrol-271", "NE940", "AG57L", "PSA-2L" and "XLA2" are available from BJ Services Co.

Example 1

A base gel was prepared by mixing HCl, corrosion inhibitor, copolymer, hydrate enhancer, Fe-270, Fe-271, and surfactant. An initial viscosity was measured at 70° F. and recorded. The fluid was then transferred to a container and placed into a water bath at 80° F. for four to eight hours. (Time spent in the water bath is representative of the average time that the base gel would exist in the field before starting acid fracturing.) After four to eight hours at 80° F. in the water bath, a measure volume (300 ml) of the base gel was placed into a blender. 2 gpt of lactic acid was then added to the measured base gel and mixing was allowed to proceed for five to ten seconds. To the base gel, containing the lactic acid, was added the crosslinker and mixing was allowed to occur for ten to fifteen seconds. The prepared fluid was then placed into a special holding cup which was then attached to a Fann50 viscometer model 50C. Nitrogen pressure (300 psi) was then applied to the fluid in the cup which was then lowered into a preheated oil bath at 180° F. The Fann50 was then set to determine the viscosity of the test fluid at a shear rate of 40 sec$^{-1}$. The test results were recorded over a set period of time at differing concentrations of lactic acid. Solution A contained 2 gpt lactic acid, Solution B contained 3 gpt lactic acid, Solution C contained 4 gpt lactic acid and Solution D contained 2 gpt lactic acid.

Solution D was treated slightly different than Solutions A, B and C. With Solution D, before the Fann50 was set to determine the viscosity of the fluid at 40 sec$^{-1}$, it was set at a high speed of 500 rpm for 2.5 minutes. The fluid viscosity was then measured at 40 sec$^{-1}$.

Figure 2:
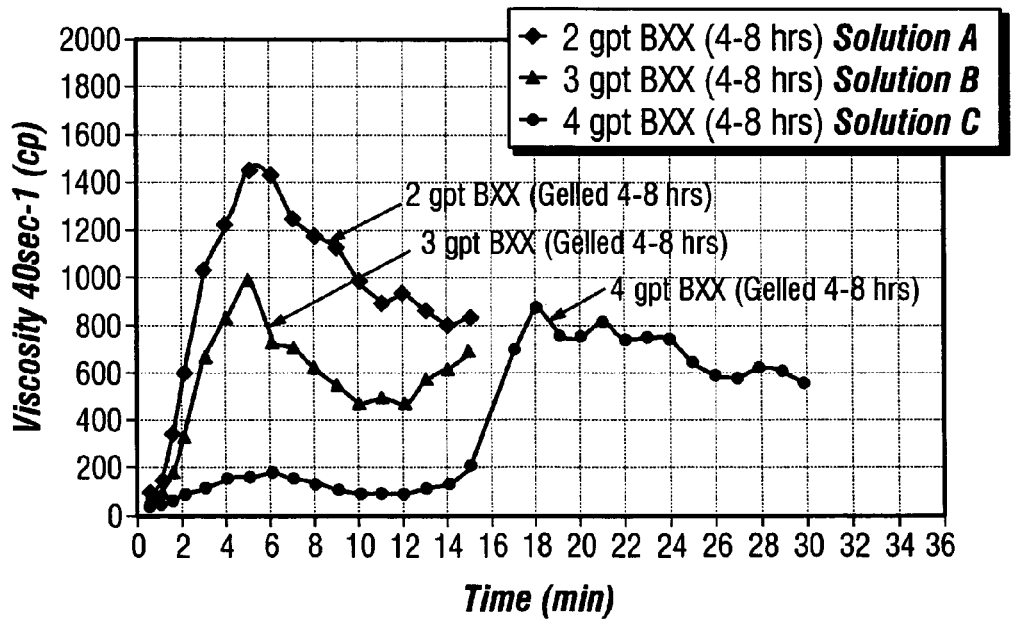
FIG. 2 is a graph of viscosity versus time (in two minute intervals) from introduction of the fluid of the invention into the subterranean formation, wherein the fluid has been gelled for between 4 to 8 hours prior to introduction into the subterranean formation.

FIG. 1 represents the viscosity measurements of Solutions A, B, C and D over ten minute intervals. FIG. 2 represents the viscosity measurements of Solutions A, B, C and D over two minute intervals.

Example 2

A base gel was prepared by mixing HCl, corrosion inhibitor, copolymer, hydrate enhancer, Fe-270, Fe-271, and surfactant. An initial viscosity was measured at 70° F. and recorded. The fluid was then transferred to a container and placed into a water bath at 80° F. for twelve to twenty-four hours. (Time spent in the water bath is representative of the average time that the base gel would exist in the field before starting acid fracturing.) After twelve to twenty-four hours at 80° F. in the water bath, a measure volume (300 ml) of the base gel was placed into a blender. 2 gpt of lactic acid was then added to the measured base gel and mixing was allowed to proceed for five to ten seconds. To the base gel, containing the lactic acid, was added the crosslinker and mixing was allowed to occur for ten to fifteen seconds. The prepared fluid was then placed into a special holding cup which was then attached to a Fann50 viscometer model 50C. Nitrogen pressure (300 psi) was then applied to the fluid in the cup which was then lowered into a preheated oil bath at 180° F. The Fann50 was then set to determine the viscosity of the test fluid at a shear rate of 40 sec$^{-1}$. The test results were recorded over a set period of time at differing concentrations of lactic acid. Solution E contained 2 gpt lactic acid, Solution F contained 3 gpt lactic acid, Solution G contained 4 gpt lactic acid and Solution H contained 2 gpt lactic acid.

Solution H was keeled sligtly different than Solutions B, F and G. With Solution H, before the Fann50 was set to determine the viscosity of the fluid at 40 sec$^{-1}$, it was set at a high speed of 500 rpm for 2.5 minutes. The fluid viscasity was then measured at 40 sec$^{-1}$.

Figure 3:
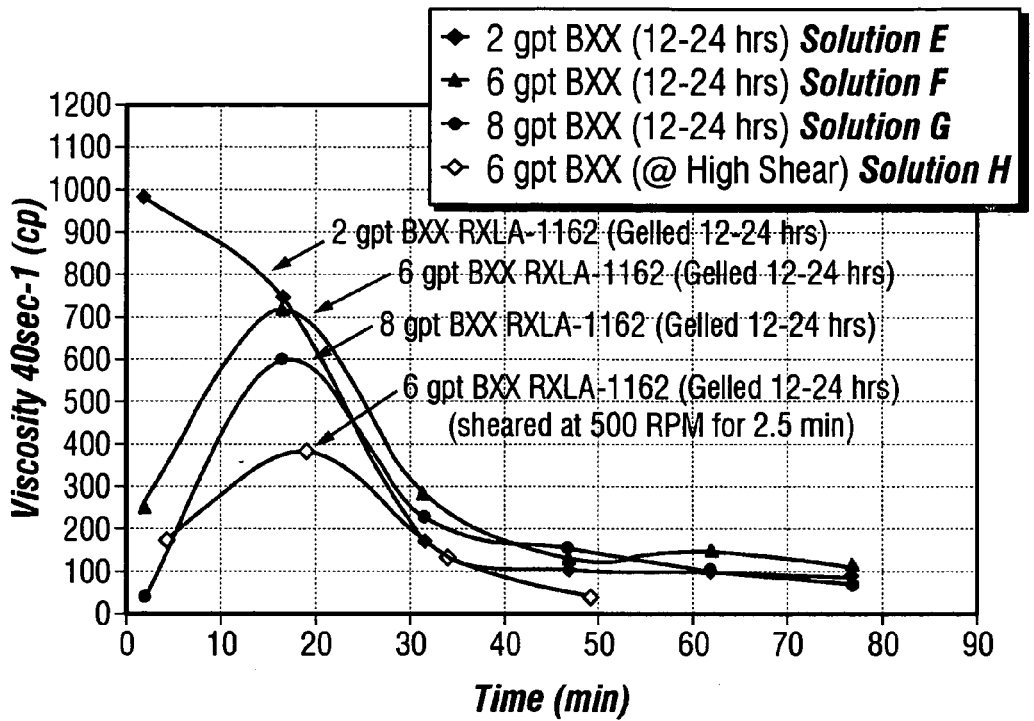
FIG. 3 is a graph of viscosity versus time (in ten minute intervals) from introduction of a fluid of the invention into the subterranean formation, wherein the fluid has been gelled for between 12 to 24 hours prior to introduction into the subterranean formation.
Figure 4:
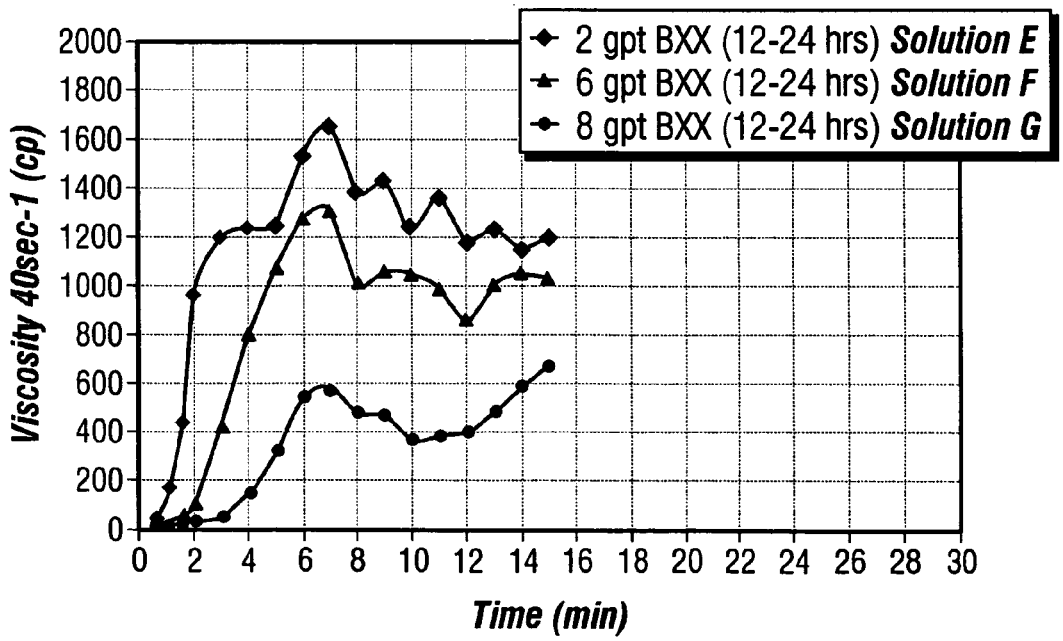
FIG. 4 is a graph of viscosity versus time (in two minute intervals) from introduction of the fluid of the invention into the subterranean formation, wherein the fluid has been gelled for between 12 to 24 hours prior to introduction into the subterranean formation.

FIG. 3 represents the viscosity measurements of Solutions E, F, G and H over ten minute intervals. FIG. 4 2 represents the viscosity measurements of Solutions E, F, G and H over two minute intervals.

Examples 1 and 2 demonstrate that lactic acid delays the time to obtain maximum viscosity (i.e., crosslinking time) of the fracturing fluid. In all cases, the maximum viscosity was obtained after ten minutes at 180° F.

Solutions D and H, wherein the fluid was sheared at 500 rpm before viscosity measurements were taken, illustrate that the fracturing fluid, though not crosslinked at the time of high shear, would still be able to crosslink and provide fairly high viscosity. Thus, the fracturing fluids of the invention can be pumped at high rates with the lactic acid without destroying the ability to provide high viscosity to the formation.

From the foregoing, it will be observed that numerous variations and modifications may be effected without departing from the true spirit and scope of the novel concepts of the invention.

What is claimed is:

1. A method of fracturing a subterranean formation of an oil or gas well to stimulate production of hydrocarbons, the method comprising the steps of:
   (1) injecting into the formation a fracturing fluid at a pressure sufficient to form fractures within the formation, the fracturing fluid comprising an aqueous acid, a synthetic polymer a metal crosslinking agent and lactic acid or lactic acid salt, wherein the concentration of lactic acid or lactic acid salt in the fracturing fluid is between from about 10 to about 1,000 pounds per 1,000 gallons of fracturing fluid; and
   (2) crosslinking the synthetic polymer and metal crosslinking agent for a time sufficient to render a crosslinked acid gel.

2. The method of claim 1, wherein the amount of lactic acid or lactic acid salt present in the fracturing fluid is an amount sufficient to retard or prevent the crosslinking reaction of synthetic polymer and metal crosslinking agent until a temperature of least 120° F. is reached in the subterranean formation.

3. The method of claim 2, wherein the amount of lactic acid or lactic acid salt present in the fracturing fluid is an amount sufficient to retard or prevent the crosslinking reaction of synthetic polymer and metal crosslinking agent until a temperature of at least 140° F. is reached in the subterranean formation.

4. The method of claim 1, wherein the lactic acid or lactic acid salt is present at a concentration less than about 80 pounds per 1000 gallons of fracturing fluid.

5. The method of claim 4, wherein the lactic acid or lactic acid salt is present at a concentration less than about 25 pounds per 1,000 gallons of fracturing fluid.

6. The method of claim 1, wherein the aqueous acid is hydrochloric acid.

7. The method of claim 6, wherein the aqueous acid further includes formic acid, acetic acid or mixtures thereof.

8. The method of claim 1, wherein the metal crosslinking agent contains either titanium, zirconium, aluminum, iron or antimony or a mixture thereof.

9. The method of claim 8, wherein the metal crosslinking agent contains aluminum and zirconium.

10. The method of claim 8, wherein the metal crosslinking agent is zirconium oxychloride, zirconium acetate, zirconium lactate, zirconium malate, zirconium citrate, titanium lactate, titanium malate, or titanium citrate or a combination thereof.

11. The method of claim 1, wherein the synthetic polymer is polyvinyl alcohol, polyacrylamide or a copolymer of acrylamide.

12. The method of claim 11, wherein the synthetic polymer is a copolymer of the formula:

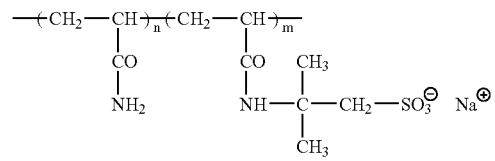

wherein m is 2 to 5 and n is 4 to 8.

13. The method of claim 11, wherein the polyacrylamide is an acrylamide polymer having less than 1% of the acrylamide groups in the form of carboxylate groups.

14. The method of claim 1, wherein the subterranean formation is a carbonate formation.

15. The method of claim 14, wherein the carbonate formation is limestone or dolomite.

16. The method of claim 1, wherein the amount of aqueous acid in the fracturing fluid is between from about 3 to about 28 percent of the total weight percent of the fracturing fluid.

17. The method of claim 16, wherein the amount of aqueous acid in the fracturing fluid is between from about 15 to about 20 percent of the total weight percent of the fracturing fluid.

18. The method of claim 1, wherein the fracturing fluid further comprises a gel breaker.

19. The method of claim 1, wherein the pH of the aqueous acid is about 0.0.

20. The method of claim 1, wherein the synthetic polymer is an emulsion polymer.

21. A method of fracturing a subterranean carbonate formation of an oil or gas well to stimulate production of hydrocarbons, the method comprising injecting into the carbonate formation a fracturing fluid at a pressure sufficient to form fractures within the formation, the fracturing fluid comprising an aqueous acid, synthetic polymer, metal crosslinking agent and lactic acid or a lactic acid salt and a gel breaker, wherein the amount of lactic acid or lactic acid salt in the fracturing fluid is between from about 10 to about 1000 pounds per 1,000 gallons of fracturing fluid.

22. The method of claim 21, wherein the lactic acid or lactic acid is present at a concentration less than about 80 pounds per 1,000 gallons of fracturing fluid.

23. The method of claim 22, wherein the aqueous acid is present at a concentration less than about 50 pounds per 1,000 gallons of fracturing fluid.

24. The method of claim 21, wherein the aqueous acid is hydrochloric acid.

25. The method of claim 24, wherein the aqueous acid further includes formic acid, acetic acid or a mixture thereof.

26. The method of claim 21, wherein the metal crosslinking agent contains either titanium, zirconium, aluminum, iron or antimony or a mixture thereof.

27. The method of claim 26, wherein the metal crosslinking agent contains aluminum and zirconium.

28. The method of claim 26, wherein the metal crosslinking agent is zirconium, oxychloride, zirconium acetate, zirconium lactate, zirconium malate, zirconium citrate, titanium lactate, titanium malate, or titanium citrate or a combination thereof.

29. The method of claim 21, wherein the synthetic polymer is polyvinyl alcohol, polyacrylamide or a copolymer of acrylamide.

30. The method of claim 29, wherein the synthetic polymer is a copolymer of

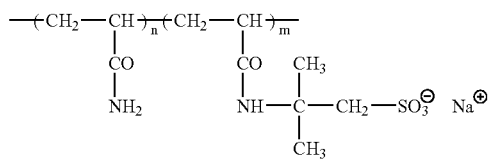

wherein m is 2 to 5 and n is 4 to 8.

31. The method of claim 21, wherein the carbonate formation is limestone or dolomite.

32. The method of claim 21, wherein the pH of the aqueous acid is about 0.0.

33. In a method of fracturing a subterranean formation of an oil or gas well to stimulate production of hydrocarbons by injecting at high pressure into the formation a fracturing fluid comprising an aqueous acid, a synthetic polymer and a metal crosslinking agent, the improvement comprising retarding or preventing crosslinking between the synthetic polymer and metal crosslinking agent at temperatures less than about 100° F. by inclusion of lactic acid or a lactic acid salt in the fracturing fluid, the lactic acid or lactic acid salt being present in an amount between from about 10 to about 1000 pounds per 1000 gallons of fracturing fluid.

34. The method of claim 33, wherein the lactic acid or lactic acid salt is present at a concentration less than about 80 pounds per 1,000 gallons of fracturing fluid.

35. The method of claim 34, wherein the Lactic acid or lactic acid salt is present at a concentration less than about 25 pounds per 1,000 gallons of fracturing fluid.

36. The method of claim 33, wherein the aqueous acid is hydrochloride acid.

37. The method of claim 36, wherein the aqueous acid further includes formic acid acetic acid or mixture thereof.

38. The method of claim 33, wherein the metal crosslinking agent contains either titanium, zirconium, aluminum, iron or antimony or a mixture thereof.

39. The method of claim 38, wherein the metal crosslinking agent contains aluminum and zirconium.

40. The method of claim 38, wherein the metal crosslinking agent is zirconium oxychloride, zirconium acetate, zirconium lactate, zirconium malate, zirconium citrate, titanium lactate, titanium malate or titanium citrate or a combination thereof.

41. The method of claim 33, wherein the synthetic polymer is polyvinyl alcohol, polyacrylamide or a copolymer or acrylamide.

42. The method of claim 41, wherein the synthetic polymer is a copolymer of the formula:

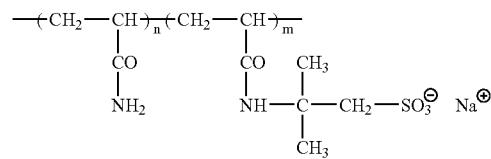

wherein m is 2 to 5 and n 4 to 8.

43. The method of claim 33, wherein the fracturing fluid further comprises a gel breaker.

* * * * *

UNITED STATES PATENT AND TRADEMARK OFFICE
CERTIFICATE OF CORRECTION

PATENT NO. : 7,205,264 B2
APPLICATION NO. : 10/758410
DATED : April 17, 2007
INVENTOR(S) : Boles It is certified that error appears in the above-identified patent and that said Letters Patent is hereby corrected as shown below:

Column 7, line 38, replace "polymer" with --polymer,--

Column 8, lines 61-62, replace "aqueous acid" with --lactic acid or lactic acid salt--

Column 9, line 7, replace "zirconium, oxychloride" with --zirconium oxychloride--

Column 9, line 34, replace "polymer" with --polymer,--

Column 10, line 4, replace "Lactic" with --lactic--

Column 10, line 9, replace "hydrochloride" with --hydrochloric--

Column 10, line 11, replace "formic acid" with --formic acid,--

Column 10, line 23, replace "copolymer or" with --copolymer of--

Signed and Sealed this

Nineteenth Day of June, 2007

JON W. DUDAS
*Director of the United States Patent and Trademark Office*